United States Patent Office 3,077,763
Patented Feb. 19, 1963

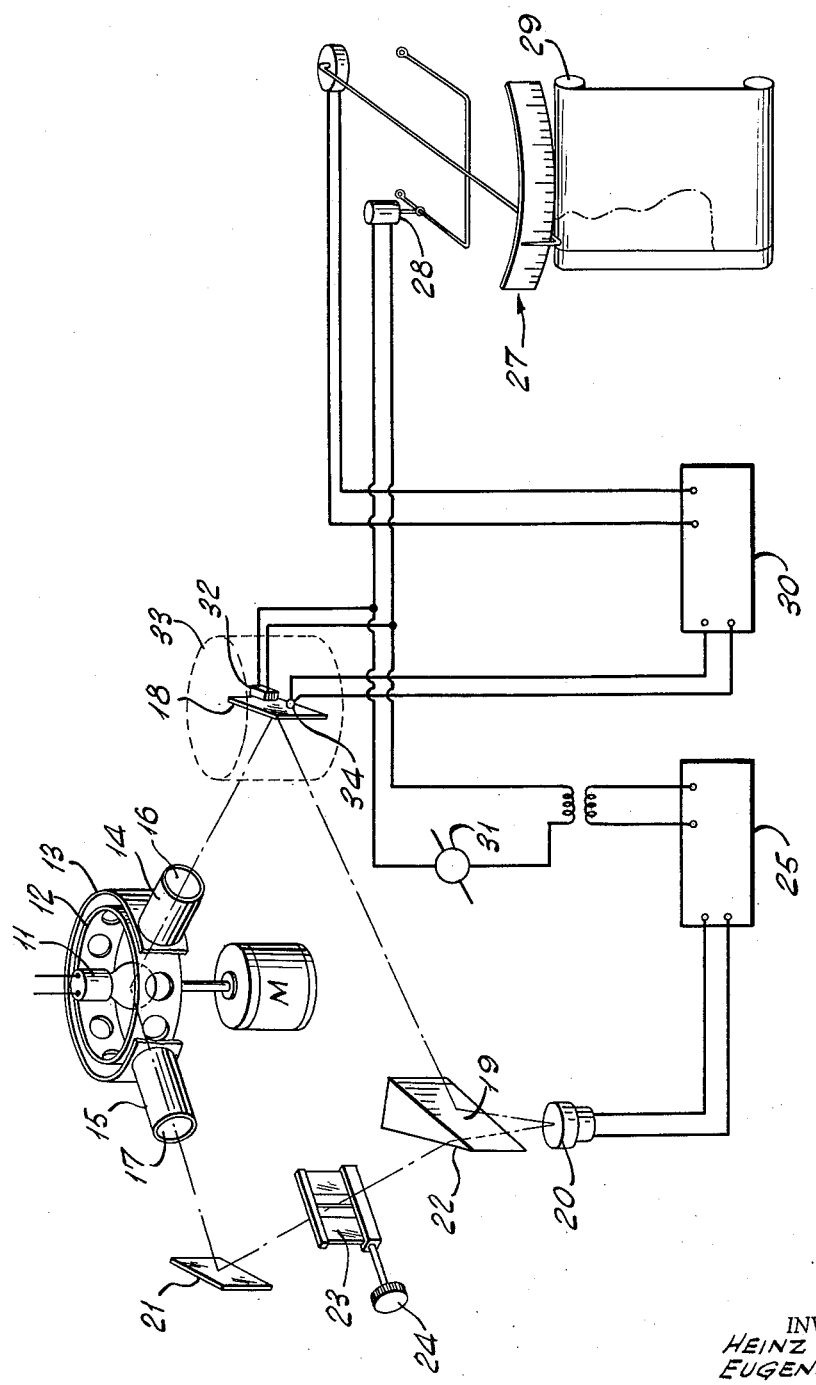

3,077,763
LOW GAS MOISTURE MEASURING APPARATUS
Heinz Gena and Eugen Werner, Leuna, Germany, assignors to VEB Leuna-Werke Walter Ulbricht, Leuna, Germany
Filed Jan. 30, 1959, Ser. No. 790,152
4 Claims. (Cl. 73—17)

The present invention relates to the measuring of low gas moistures according to the dew point method and more particularly to a device for measuring low gas moistures.

Heretofore, the art has endeavored to measure very low gas moistures by using a dew point hygrometer, e.g., moistures which are of the order of 1 to 0.001 gram of water to a kilogram of gas. According to the principle of this device, a mirror is cooled until it is coated with dew and the mirror temperature is read at the moment of dew formation on a thermometer. Because of the fact that the mirror temperatures at the moment of dew formation and the moisture of the gas surrounding the mirror depend on common physical laws, the gas moistures can be calculated from the temperature of the mirror. Attempts have been made to replace the eye of the person observing the dew formation by a photoelectric device. A disadvantage of this type of device is that it depends on the condition of the device, e.g., of the light source and of the photoelectric cell which deteriorate with time, so that there is no reference point to which the device is fixed.

Although many attempts were made to overcome the foregoing difficulties, none, as far as we are aware, was entirely successful when carried into practice commercially on an industrial scale.

It has now been discovered that gas moistures can be determined which are far below those determined by the use of other measuring instruments and the problem of the deterioration of the light source and of the photoelectric cell which is common with photoelectric devices, is eliminated. Furthermore, an accurate reference point is furnished upon which the measurement is based.

It is an object of the present invention to provide a device for measuring low gas moistures.

Another object of the invention is to provide a method for the measuring of low gas moistures.

Other objects and advantages will become apparent from the following description in conjunction with the accompanying drawings, in which:

FIG. 1 depicts a device for measuring low gas moistures.

Generally speaking, the present invention contemplates the use of a light bridge for reading the dew point. Light rays from a light source are conducted along two paths into a photoelectric cell. Along one path the light rays are reflected by the dew mirror; along the other path the light rays are reflected by a second mirror and the intensity of the light remains unchanged. Alternating rays of light from each path act upon a photoelectric cell, that is to say, light rays arrive periodically in the photoelectric cell over the dew mirror and alternatively over the second mirror where the intensity of the light is unchanged. It is also possible to use auxiliary mirrors so that the photosensitive layer of the photoelectric cell is hit at the same point by both rays. Adjustable means are provided to balance the intensity of the two rays, e.g., along the path of the ray reflected by the second mirror. In this way, the dew point can be measured by prebalancing the bridge at a point where fogging of the dew mirror is just noticeable by adjustment of the adjustable means provided to balance the intensity of the light, and by lowering the dew mirror temperature and noting the temperature at which balance occurs.

In carrying the invention into practice, it is preferred to make use of the device depicted in FIG. 1 wherein there is a light source 11. A perforated cylinder 12 driven by motor M rotates about lamp 11 and there is a fixed cylinder 13 around the rotating cylinder 12 and the lamp 11. Two openings 14 and 15 are provided in fixed cylinder 13. The perforations in perforated cylinder 12 are so spaced that rays from the light source will pass alternately through openings 14 and 15. The light rays coming from the lamp will be focused by lenses 16 and 17 which are placed before openings 14 and 15, respectively. The rays coming from opening 14 arrive on the dew mirror 18 where they are reflected over auxiliary mirror 19 into photoelectric cell 20. The other ray coming from opening 15 is reflected by a second mirror 21 and by auxiliary mirror 22 so as to strike against the photosensitive layer of photoelectric cell 20 at the same point as the ray coming from opening 14. Along the path of the ray which strikes mirror 21, i.e., the path wherein the mirror does not change the intensity of the ray, there is located an adjustable diaphragm 23 having an adjustment screw 24 to adjust the aperture of the diaphragm so as to regulate the intensity of the light.

The output of the electric cell 20 is coupled by means of amplifier 25 and transformer 26 to the release mechanism 28. A current reading meter 31 is disposed in circuit on the transformer 26 to the release mechanism 28. The release mechanism 28 is part of reading instrument generally designated 27 which also includes the writing mechanism 29. The reading instrument 27 is connected by means of amplifier and control apparatus 30 to a thermocoupled junction 34 which is disposed to measure the temperature at the dew mirror 18. The reading instrument 27 is thus responsive to the temperature at the dew mirror and is calibrated to read both the temperature at the dew mirror and the dew point. The release mechanism 28 is connected to the writing mechanism in such a way as to place the reading instrument 27 in a non-writing condition when a signal reaches the release mechanism and to place the reading instrument in a writing condition when no signal reaches the release mechanism. The signal from the transformer 26 is also connected to switching means 32 which control the temperature-regulating means (not shown) for the dew mirror. The switching means are set up to raise the temperature at rest, that is when there is no signal from the transformer and to initiate cooling effect when a signal exists from the transformer. The dew mirror is disposed within a container 33 within which the gas containing some moisture to be measured is disposed. As will be seen a signal from the transformer 26 will at one time effectively lower the temperature at the dew mirror 18 and prevent the reading instrument 27 from writing; that is, prevent the writing mechanism 29 from being engaged. When no voltage appears across the secondary of the transformer 26, the switch 32 will act to raise the temperature at the dew mirror 18 and at the same time the release mechanism 28 will engage the writing mechanism 29 so that the temperature at the dew mirror will be written upon the reading instrument 27.

Means are provided for alternately exposing the photocell to the light rays coming from the dew mirror 18 and to the light rays coming from the second mirror 21, e.g., a revolving, perforated cylinder 12 is revolved in close proximity to the fixed cylinder by revolving means M, the perforations on said cylinder being so spaced that the light rays will pass alternately through the first and second opening. The aperture 23 is pre-set by knob 24 so that the light coming from the mirror 21 will exactly equal the light coming from the mirror 18 just when the dew mirror 18 becomes befogged. This will occur when the light intensity reaching the photocell from both sources is the same. At such condition the primary of the transformer 26 will be subjected to a substantially direct current. A direct current through a transformer primary produces no current in the transformer secondary and this condition will be indicated by the meter 31. Thus the bridge can be made to balance by the adjustment of knob 24. When the bridge is in an unbalanced state, the amount of light reaching the photocell 20 from one mirror will exceed the light from the other mirror and the output of the photocell will be cyclical. The primary of the transformer 26 will then have a pulsating D.C. voltage across its terminals. The resulting signal on the secondary will be an A.C. voltage. Thus a signal will reach the release mechanism and the switch 32 only when the bridge is unbalanced. The transformer 26 in this embodiment may be replaced by any A.C. sensing device such as a capacitor.

In operation, the motor M turns the perforated cylinder 12 so that the light focuses upon the mirrors 18 and 21. The temperature at the dew-mirror 18 is at this time set above the temperature at which fogging appears. Thus, the bridge will be in an unbalanced state, that is, the light reaching the photocell from the two sources or the two mirrors will not be the same. Such a condition will place a signal upon the secondary of the transformer 26 and the switch mechanism 32 will initiate cooling of the dew mirror 18. Simultaneously, the release mechanism 28 will disengage the writing mechanism 29 in reading instrument 27. When the temperature at the dew-mirror 18 becomes sufficiently low to form dew upon the mirror, the light impinging upon the photocell 20 from the two paths will be equal and no signal will appear on the secondary of transformer 26. The release mechanism 28 will engage the writing mechanism 29 and the temperature at that point upon the dew mirror will be indicated by the reading instrument. Simultaneously, the switch 32 will actuate means which raise the temperature at the dew-mirror 18 and as soon as the fogging at the dew-mirror 18 is dissipated, the condition of unbalance at the photoelectric cell will again occur. The voltage across the transformer 26 will again actuate the release mechanism to disengage the writing mechanism and the switch 32 will actuate the cooling mechanisms. This cycle will be repeated and repeated until an accurate measure of the dew point of the moisture containing gas will be given.

It is to be observed that the present invention also provides for a method for measuring low gas moistures according to the dew point method. This method comprises the steps of forming a light bridge having two paths. The light along one of said paths is reflected in the direction of light sensitive means, e.g., a photoelectric cell. The light along the other path of the bridge is also reflected by a dew mirror in the direction of said light sensitive means. The dew mirror is exposed to the gas whose moisture is to be measured. The light sensitive means are alternately exposed to the action of the light traveling along both paths of the bridge which causes an alternating high and low signal in the light sensitive means. This signal is balanced out when the mirror is just fogged and the moisture content is procured from the temperature needed to balance out the alternating signal as the mirror temperature falls.

Since certain changes in carrying out this method of dew point measurement and in the construction and arrangement of the apparatus set forth which embody the invention, can be made without departing from its scope, it is intended that all the matter contained in the above description or shown in the accompanying drawing shall be interpreted as illustrative and not in a limiting sense.

We claim:

1. A dew point hygrometer for measuring the moisture content of a gas, comprising a single light source, a support member having first and second openings around said light source, a dew mirror subjected to said gas, a second mirror isolated from said gas, a single light sensitive element, a first lens for focusing the light from the source through said first opening and onto said dew mirror, a second lens for focusing the light from said source through said second opening and onto said second mirror, said mirrors and light sensitive element being positioned so that light is reflected from the mirrors onto said light sensitive element, means alternately exposing said light sensitive element to the light reflected from said dew mirror and the light reflected from said second mirror, amplifier means connected from said element for producing a control voltage proportional to the difference in intensity between the light rays reflected from said mirrors, means responsive to said control voltage for varying the temperature of said dew mirror, means responsive to said amplifier means for indicating the temperature at which fogging of said dew mirror occurs, and adjusting means positioned in one of the light paths from said mirrors for limiting the amount of light in said path that falls on said photosensitive element.

2. A dew point hygrometer according to claim 1, including detector means connected to said amplifier for producing a null voltage when said dew mirror becomes fogged, and wherein said temperature varying means includes a switch responsive to a voltage from said amplifier to initiate cooling of said dew mirror until said null voltage is received, and said indicating means includes means inhibiting a temperature reading in the absence of said null signal.

3. A dew point hygrometer according to claim 2, wherein said support member is a fixed cylinder, and wherein said alternately exposing means comprises a rotatable, perforated cylinder mounted to rotate about said light source in close proximity to said fixed cylinder, the perforations of said perforated cylinder being so spaced that the light rays from said light source pass alternately through said first and second openings.

4. A dew point hygrometer according to claim 2, wherein the output of said amplifier means is a fluctuating D.C. voltage and said detector means comprises A.C. coupling means connected to the output of said amplifier means for detecting said null voltage.

References Cited in the file of this patent

UNITED STATES PATENTS

| | | |
|---|---|---|
| 2,624,195 | Van Alen | Jan. 6, 1953 |
| 2,710,559 | Heitmuller et al. | June 14, 1955 |
| 2,893,237 | De Coriolis et al. | July 7, 1959 |
| 2,909,058 | Hassler et al. | Oct. 20, 1959 |

FOREIGN PATENTS

| | | |
|---|---|---|
| 551,989 | Great Britain | Mar. 18, 1943 |